(12) United States Patent
Nishino et al.

(10) Patent No.: US 8,973,952 B2
(45) Date of Patent: Mar. 10, 2015

(54) CONNECTOR

(75) Inventors: Ryo Nishino, Yokohama (JP); Yoshie Sato, Yokohama (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/241,795

(22) PCT Filed: Mar. 30, 2012

(86) PCT No.: PCT/JP2012/058523
§ 371 (c)(1),
(2), (4) Date: Feb. 27, 2014

(87) PCT Pub. No.: WO2013/031272
PCT Pub. Date: Mar. 7, 2013

(65) Prior Publication Data
US 2014/0210204 A1    Jul. 31, 2014

(30) Foreign Application Priority Data

Aug. 29, 2011 (JP) ................................. 2011-186213

(51) Int. Cl.
*F16L 39/00* (2006.01)
*F16L 37/12* (2006.01)
*F16L 37/088* (2006.01)

(52) U.S. Cl.
CPC ............ *F16L 37/1225* (2013.01); *F16L 37/088* (2013.01)
USPC ............................... 285/319; 285/305; 285/81

(58) Field of Classification Search
CPC .................................................... F16L 37/144

USPC ............................................. 285/83, 305, 319
See application file for complete search history.

(56) References Cited

U.S. PATENT DOCUMENTS

| | | | | |
|---|---|---|---|---|
| 4,591,192 A | * | 5/1986 | Van Exel et al. | 285/83 |
| 4,721,331 A | * | 1/1988 | Lemelshtrich | 285/305 |
| 5,542,716 A | * | 8/1996 | Szabo et al. | 285/305 |
| 5,586,792 A | | 12/1996 | Kalahasthy et al. | |
| 5,683,117 A | * | 11/1997 | Corbett et al. | 285/24 |
| 5,730,481 A | * | 3/1998 | Szabo et al. | 285/305 |
| 6,086,119 A | | 7/2000 | Hansel | |
| 6,702,335 B2 | * | 3/2004 | Bahner et al. | 285/305 |

(Continued)

FOREIGN PATENT DOCUMENTS

| | | |
|---|---|---|
| JP | 05-033891 A | 2/1993 |
| JP | 07-260073 A | 10/1995 |

(Continued)

OTHER PUBLICATIONS

International Search Report (ISR) (PCT Form PCT/ISA/210), in PCT/JP2012/058523, dated Jun. 12, 2012.

*Primary Examiner* — Aaron Dunwoody
(74) *Attorney, Agent, or Firm* — McGinn IP Law Group, PLLC (57) ABSTRACT

A connector includes a housing having a connecting portion, an insertion portion, and slits, and a retainer having arms, and engaging portions. The engaging portions are engaged with a flange portion of a first pipe member so as to retain the first pipe member. An inclinatory contact portion is provided between inner circumferential surfaces of the slits and outer surfaces of the, such that the pair of arms are urged in directions of approaching each other when a force to pull out the first pipe member from the insertion portion is exerted.

5 Claims, 11 Drawing Sheets

(56) References Cited

U.S. PATENT DOCUMENTS

| | | | |
|---|---|---|---|
| 7,455,327 B2* | 11/2008 | Lorenz | 285/308 |
| 7,651,138 B2* | 1/2010 | Feger et al. | 285/319 |
| 7,695,024 B2* | 4/2010 | Ostergren et al. | 285/308 |
| 8,240,716 B2* | 8/2012 | Kerin et al. | 285/93 |
| 8,336,919 B2* | 12/2012 | Gillet et al. | 285/93 |
| 8,720,952 B2* | 5/2014 | Matsunaga | 285/93 |
| 2005/0087981 A1* | 4/2005 | Yamada et al. | 285/81 |
| 2005/0134040 A1* | 6/2005 | Andre | 285/305 |
| 2006/0082145 A1* | 4/2006 | Steveley | 285/305 |
| 2008/0048442 A1* | 2/2008 | Kerin et al. | 285/305 |
| 2008/0111371 A1* | 5/2008 | Feger et al. | 285/305 |
| 2008/0224469 A1* | 9/2008 | Ostergren et al. | 285/313 |
| 2010/0032937 A1* | 2/2010 | Kerin et al. | 285/3 |
| 2010/0052313 A1* | 3/2010 | Ishida et al. | 285/93 |
| 2010/0052315 A1* | 3/2010 | Kerin et al. | 285/148.21 |
| 2010/0276924 A1* | 11/2010 | Gillet et al. | 285/93 |
| 2011/0089684 A1* | 4/2011 | Schutte et al. | 285/305 |
| 2011/0127766 A1* | 6/2011 | Tsurumi | 285/305 |
| 2013/0112285 A1* | 5/2013 | Bunoz | 137/217 |
| 2013/0147187 A1* | 6/2013 | Yamada et al. | 285/319 |
| 2013/0154255 A1* | 6/2013 | Daimon et al. | 285/81 |
| 2014/0312614 A1* | 10/2014 | Barthel et al. | 285/319 |
| 2014/0319820 A1* | 10/2014 | Takimoto et al. | 285/148.21 |

FOREIGN PATENT DOCUMENTS

| | | |
|---|---|---|
| JP | 08-277980 A | 10/1996 |
| JP | 10-061859 A | 3/1998 |
| JP | 11-500817 A | 1/1999 |
| JP | 2001-289381 A | 10/2001 |
| JP | 2003-269676 A | 9/2003 |
| JP | 2005-180687 A | 7/2005 |

* cited by examiner

CONNECTOR

TECHNICAL FIELD

The present invention relates to connectors for connecting pipe members such as hoses, tubes, and pipes.

BACKGROUND ART

For example, plural hoses, tubes, pipes and the like are used in radiators, heater units, and fuel supply systems of automobiles. Connectors are used to connect the pipe members of these hoses, tubes, pipes, and the like.

Patent document 1 discloses a quick connector that includes a tubular connector housing and a wire retainer. The tubular connector has a connecting portion formed on one side in an axial direction so as to be connected with a hose, and a pair of engaging slits formed on the other side in the axial direction at radially opposite portions. The wire retainer has the angular-U shape or the angular-U like shape that includes a pair of engaging aims so as to be attached to the other side in the axial direction of the connector housing by inserting the pair of engaging arms into the engaging slits to sandwich the connector housing. When the insertion end portion is inserted, the engaging arms of the wire retainer protrude from the engaging slits into the connector housing so as to be brought into snap engagement with a ring-shaped engaging protrusion that is formed at an insertion end portion of a pipe member.

CITATION LIST

Patent Literature

Patent Document 1
JP-2005-180687-A

DISCLOSURE OF THE INVENTION

Problems To Be Solved By the Invention

In the connector of Patent Document 1, when the hose and the pipe member are connected with each other, the ring-shaped engaging protrusion of the pipe member is engaged with each of the engaging arms of the wire retainer. However, when a large force is exerted in a direction that the insertion end portion of the pipe member is pulled out from the connector housing under the impact of an accident or the like, the pair of engaging arms may be pressed by the ring-shaped engaging protrusion of the pipe member and diametrically expanded to release the engaging state between the engaging arms and the ring-shaped engaging protrusion, and therefor, the pipe member may be pulled out.

Thus, an object of the present invention is to provide a connector that is capable of reliably preventing a pipe member from being pulled out even when a large force is exerted on the pipe member.

Means For Solving the Problem

To achieve the object described above, there is provided
a connector for connecting a first pipe member having a flange portion around an outer circumference with a second pipe member, the connector including
a tube shaped housing having
a connecting portion, at one end thereof, formed to be connected with the second pipe member,
an insertion portion, at the other end thereof, formed to be inserted with the first pipe member, and
a pair of slits formed on a peripheral wall at a side of the insertion portion; and
a arch shaped retainer having
a pair of arms formed to be inserted into the slits, and
engaging portions inwardly protruding from the arms to enter into an inner circumference of the insertion portion of the housing and to be engaged with the flange portion of the first pipe member, thereby retaining the first pipe member,
wherein an inclinatory contact portion is provided between inner circumferential surfaces of the slits at a side of a first pipe member pull-out direction and outer surfaces of the arms at a side of the first pipe member pull-out direction, such that the pair of arms are urged in directions of approaching each other when a force to pull out the first pipe member from the insertion portion is exerted.

There may be provided the connector,
wherein the inclinatory contact portion has:
tapered grooves formed on the inner circumferential surfaces of the slits at the side of the first pipe member pull-out direction; and
tapered ribs formed on the outer surfaces of the arms at the side of the first pipe member pull-out direction.

There may be provided the connector,
wherein distal end surfaces of the engaging portions of the retainer have inclined shapes of expanding the pair of arms to release engagement with the flange portion of the first pipe member when the retainer is pressed toward the housing to bring the engaging portions into contact with end portions in a circumferential direction of the slits.

There may be provided the connector,
wherein inner circumferential surfaces of end portions in a circumferential direction of the slits have inclined shapes of getting lower gradually from a side of the insertion portion of the housing toward a side of the connecting portion of the housing and of getting lower gradually from a radial inside to the radial outside of the insertion portion of the housing.

There may be provided the connector,
wherein the housing has an inclined protrusion on an outer circumference of a peripheral wall between the pair of slits formed to cause the retainer to move to the side of the connecting portion of the housing when the retainer is pressed toward the housing.

Advantageous Effects of Invention

According to the present invention, inserting the arms into the slits of the housing, making the engaging portions of the arms protrude to the inner circumference of the insertion portion of the housing, and engaging the flange portion of the first pipe member with the engaging portions of the retainer allows the first pipe member to be connected with the second pipe member.

Thus, when a force to pull out the first pipe member from the insertion portion is exerted in the direction of pulling out the first pipe member, the pair of arms are urged in the directions of approaching each other by the inclinatory contact portion provided between the inner circumferential surfaces of the slits at the side of the first pipe member pull-out direction and the outer surfaces of the arms at the side of the first pipe member pull-out direction. Thus, the pair of arms can be prevented from opening, and an engagement range between the flange portion of the first pipe member and the engaging portions of the retainer can be increased, so that the first pipe member can be reliably prevented from being pulled out from the insertion portion, thereby increasing connection strength between the first pipe member and the second pipe member.

BRIEF DESCRIPTION OF THE DRAWINGS

FIGS. 11A and 11B show the movement of the retainer in the connector at the time when the first pipe member is pulled out, where FIG. 11A is an enlarged explanatory view of relevant parts before a pull-out force is exerted on the first pipe member, and FIG. 11B is an enlarged explanatory view of the relevant parts when a pull-out force is exerted on the first pipe member.

FIGS. 13A and 13B show the movement of the retainer in the connector at the time when the retainer is removed from the housing, where FIG. 13A is an enlarged sectional front view of relevant parts of the connector, and FIG. 13B is an enlarged side view of the relevant parts of the connector.

BEST MODE FOR CARRYING OUT THE INVENTION

One embodiment of a connector according to the present invention will be described with reference to FIGS. 1 to 13B.

Figure 1:
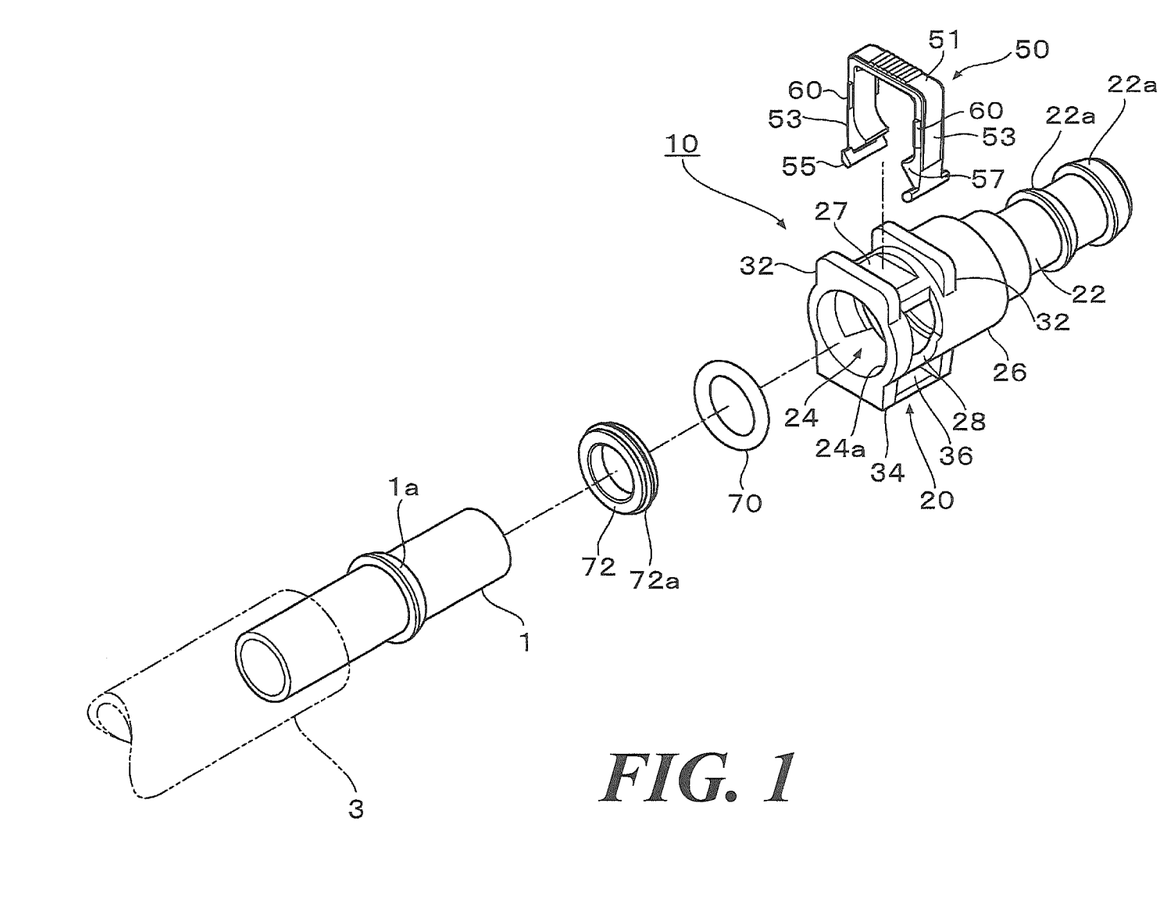
FIG. 1 is an exploded perspective view of a connector according to one embodiment of the present invention.
Figure 10:
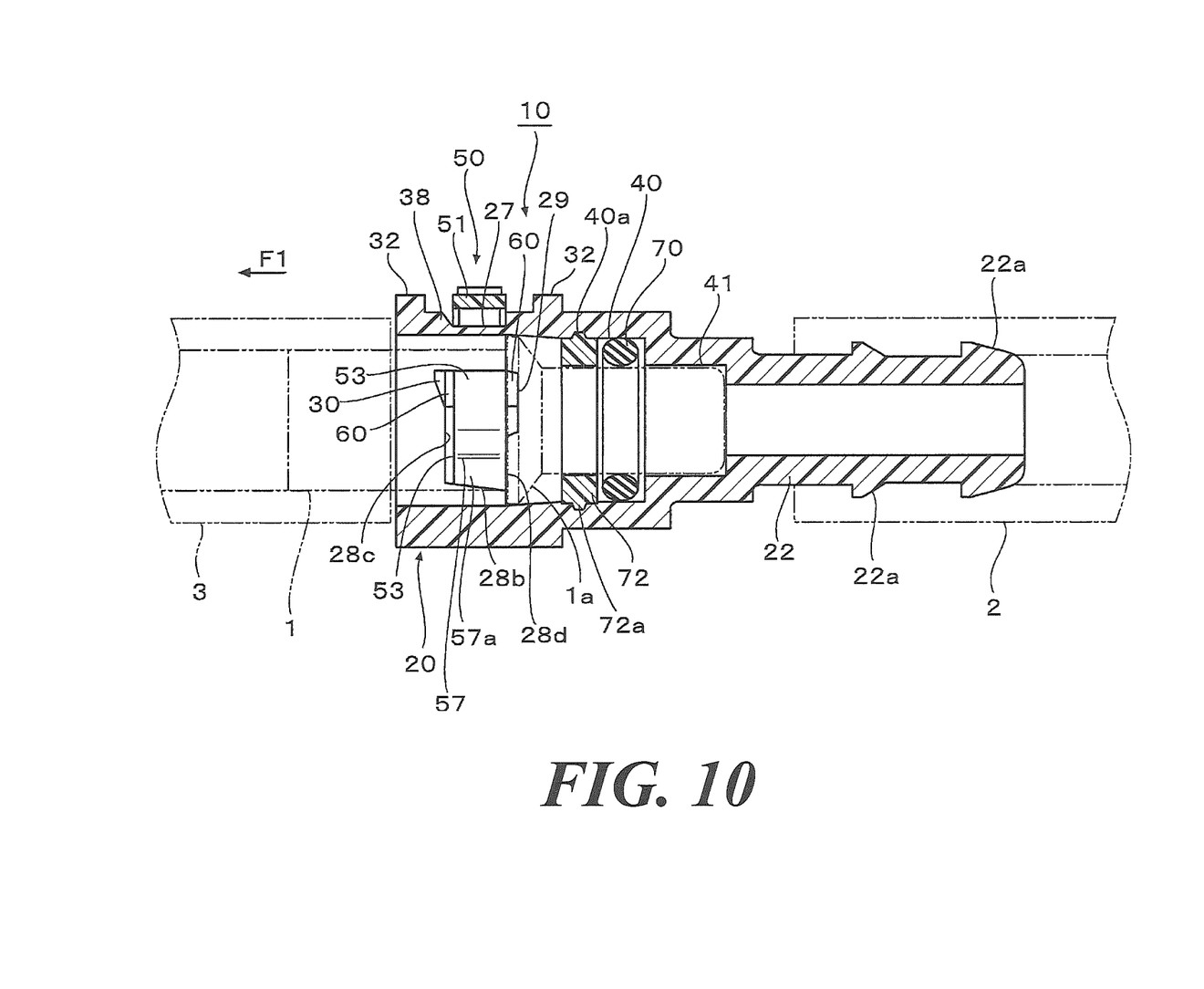
FIG. 10 is a sectional side view of the connector.

This connector 10 is for connecting a first pipe member 1 including a flange portion 1a around an outer circumference with a second pipe member 2 as shown in FIGS. 1 and 10. The flange portion 1a of the first pipe member 1 is tapered along an insertion direction. In the present embodiment, a third pipe member 3 is further mounted on an outer circumference of the first pipe member 1, and the third pipe member 3 is connected with the second pipe member 2 via the first pipe member 1. Examples of these pipe members include hoses, tubes, pipes and the like that are used in radiators, heater units, and fuel supply systems of automobiles, and these pipes can be used also for connection of pipe members disposed at other locations. The third pipe member 3 may not be mounted on the first pipe member 1, and instead, a metal tube having a flange portion so as to function as the first pipe member 1 may be connected with the second pipe member 2.

As shown in FIG. 1, the connector 10 according to the present embodiment includes a housing 20 having a tube shape that includes a pair of slits 28, a retainer 50 having an arch shape that includes a pair of arms 53, 53 to be inserted into the pair of slits 28, 28 so as to retain the first pipe member 1 when mounted on the housing 20, a seal ring 70 to be inserted into the housing 20, and a stopper ring 72 which retains the seal ring 70.

As shown in FIGS. 3 to 6, the housing 20 extends to a predetermined length, and has an approximately circular cylindrical shape that is open at both the ends in an axial direction, of which one end is a connecting portion 22 for connecting the second pipe member 2, and the other end is an insertion portion 24 for inserting the first pipe member 1. Plural ring-shaped protrusions 22a protrude at predetermined intervals on an outer circumference of the connecting portion 22, and the second pipe member 2 is mounted on the outer circumference of the connecting portion 22 to be connected therewith (see FIG. 10). The housing 20 may be provided with plural connecting portions 22 so as to connect the first pipe member 1 with the plural second pipe members 2. For example, the housing 20 may be provided with a pair of connecting portions 22, 22 so as to have the Y shape. That is, the present invention provides not only a connector capable of connecting a first pipe member with one second pipe member, but also a connector capable of connecting a first pipe member with one or more second pipe members.

A flat surface 27 is formed on a part of a peripheral wall 26 of the housing 20 at the side of the insertion portion 24. A pair of slits 28, 28 are formed on both sides of the flat surface 27 of the peripheral wall 26 slightly apart from an opening 24a of the insertion portion 24 (see FIGS. 5 and 6). The pair of slits 28, 28 have an arc shape along a circumferential direction and a predetermined width.

Figure 3:
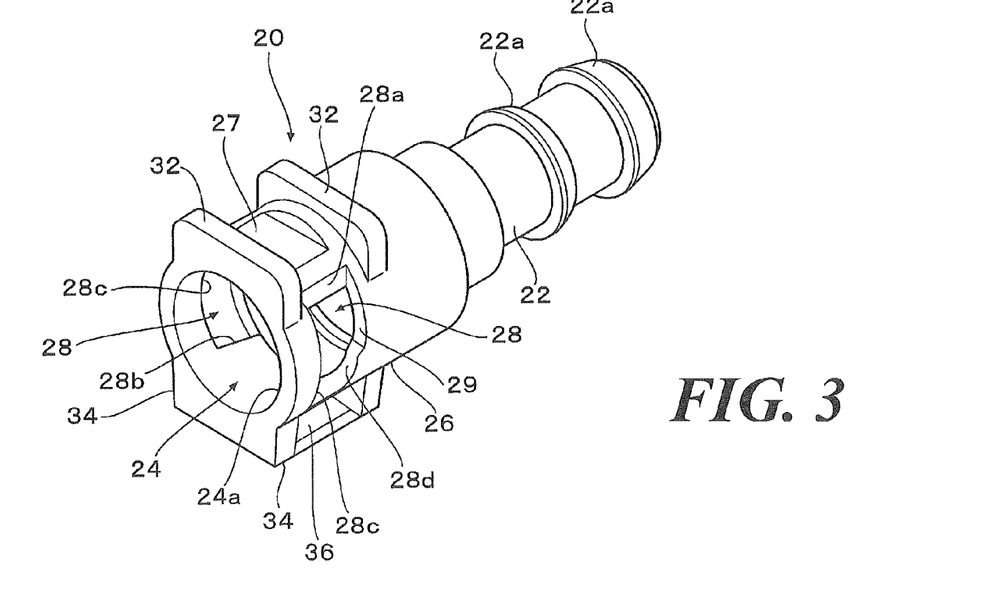
FIG. 3 is a perspective view of a housing of the connector.
Figure 5:
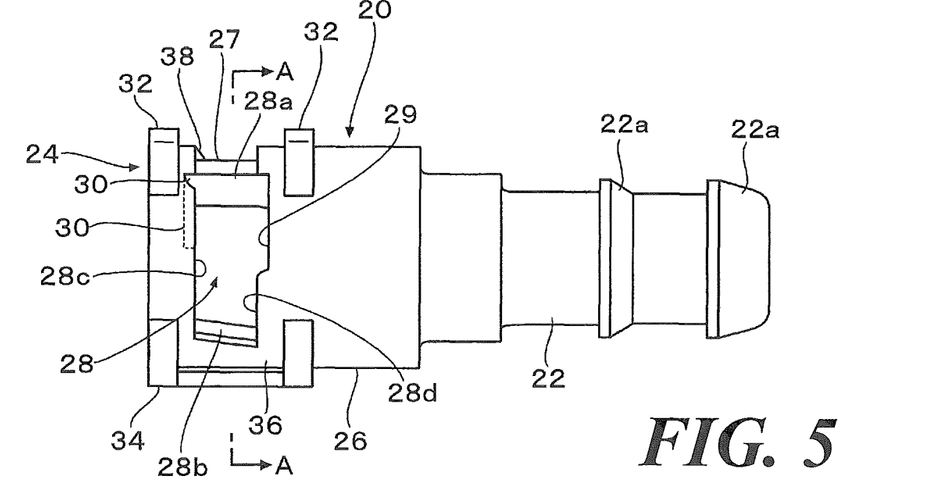
FIG. 5 is a side view of the housing.
Figure 6:
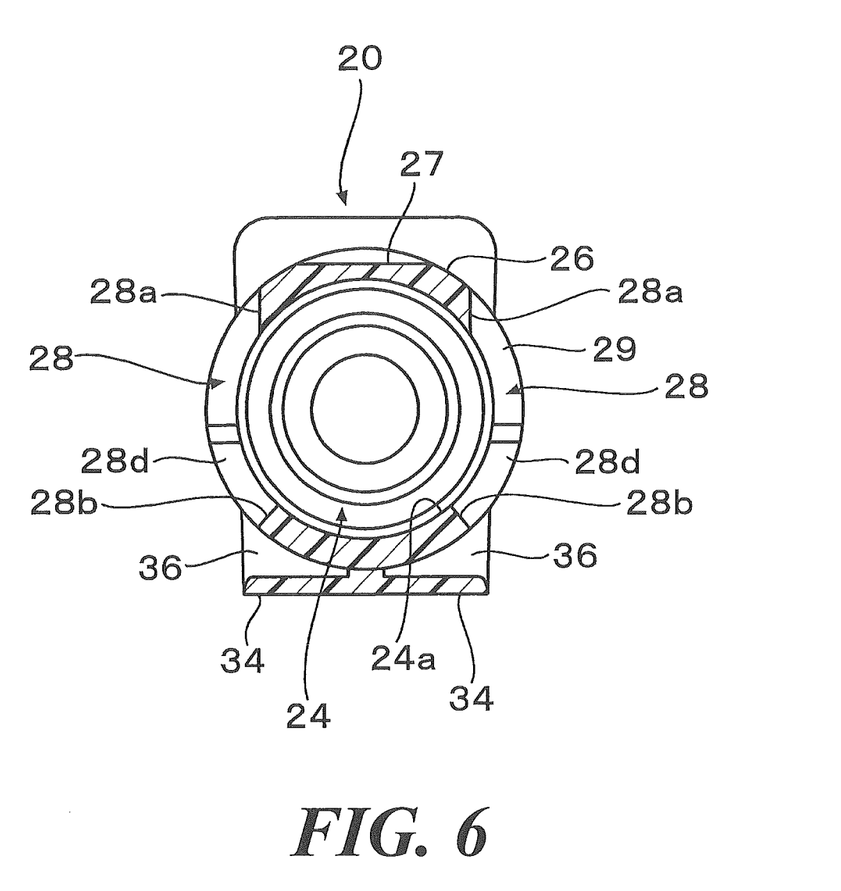
FIG. 6 is a sectional view of the housing taken along the arrow line A-A of FIG. 5.

As shown in FIGS. 3 and 6, inner circumferential surfaces 28a at one end portions in the circumferential direction of the slits 28 are perpendicular to the flat surface 27. As shown in FIGS. 3, 5 and 6, inner circumferential surfaces 28b at the other end portions in the circumferential direction of the slits 28 have an inclined shape of getting lower gradually from the side of the insertion portion 24 to the side of the connecting portion 22, and getting lower gradually from the radial inside to the radial outside of the insertion portion 24.

The slits 28 further have inner circumferential surfaces 28c at the side of the opening 24a of the insertion portion 24 and inner circumferential surfaces 28d at the side of the connecting portion 22 which are facing and parallel with each other (see FIGS. 3 and 5). Rib-relief grooves 29 are formed in the inner circumferential surfaces 28d at the side of the connecting portion 22 in predetermined ranges starting from the inner circumferential surfaces 28a.

Figure 11A:
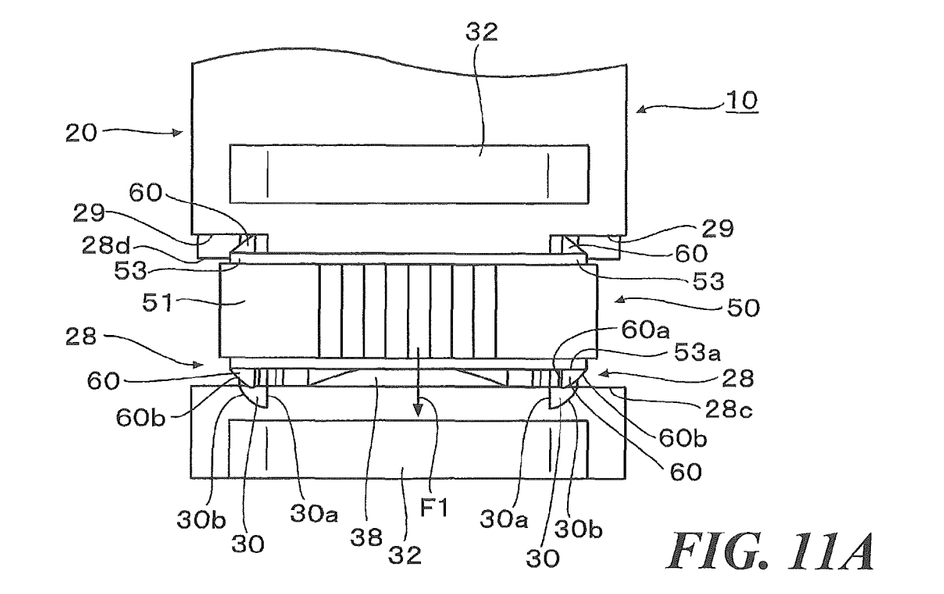

The direction of pulling out the first pipe member 1 that is inserted into the insertion portion 24 is defined as F1 (first pipe member pull-out direction F1). As shown in FIGS. 10 and 11A, grooves 30 having a taper shape are formed on the slits 28 at the side of the first pipe member pull-out direction F1, that is, on the inner circumferential surfaces 28c at the side of the opening 24a of the insertion portion 24.

Figure 4:
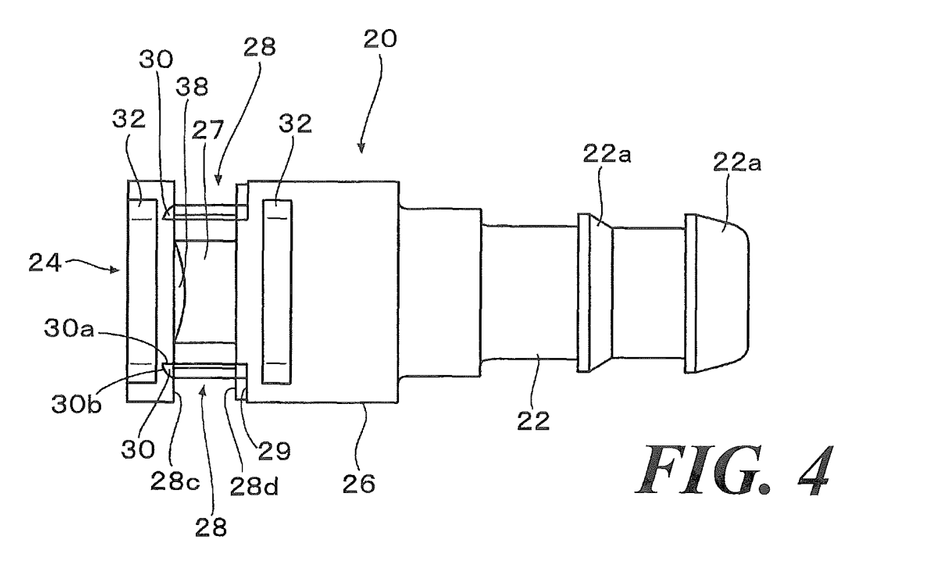
FIG. 4 is a plan view of the housing.
Figure 11B:
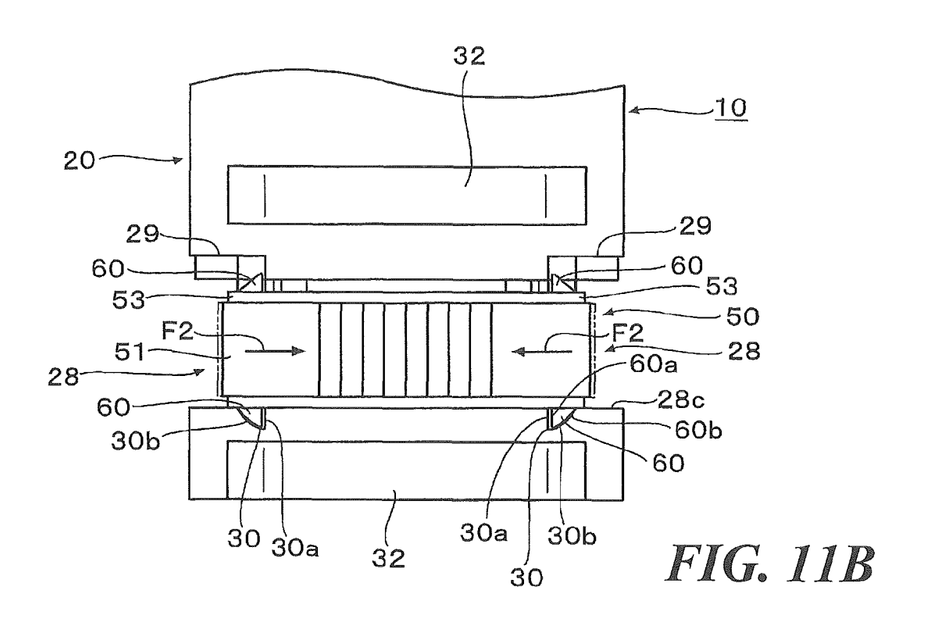
Figure 12A:
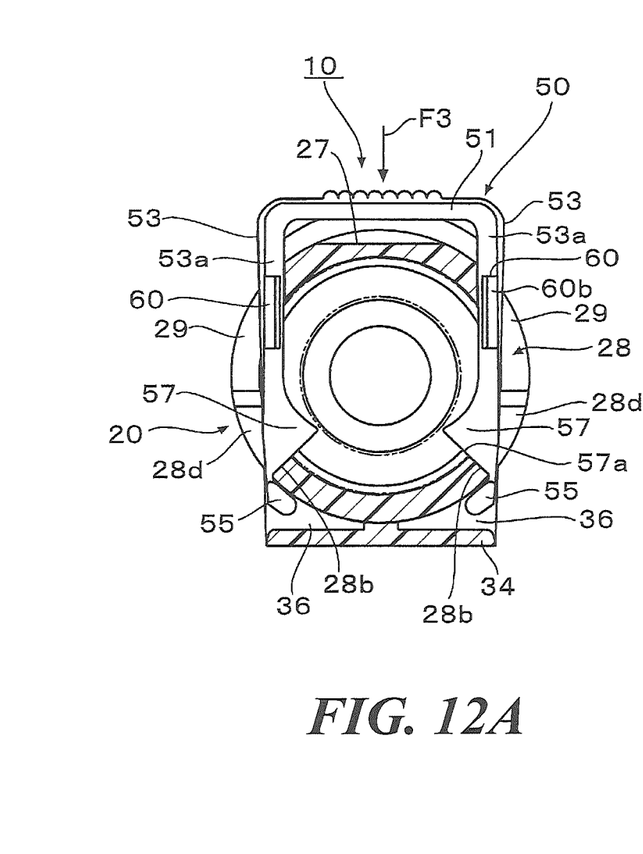
FIG. 12A is an enlarged sectional front view of relevant parts of the connector.
Figure 12B:
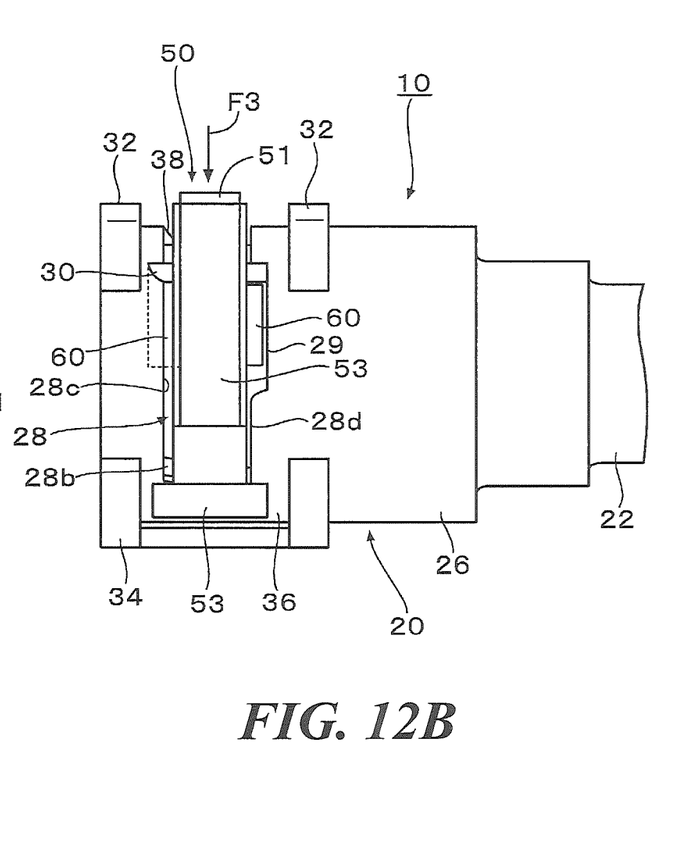
FIG. 12B is an enlarged side view of the relevant parts of the connector.
Figure 13A:
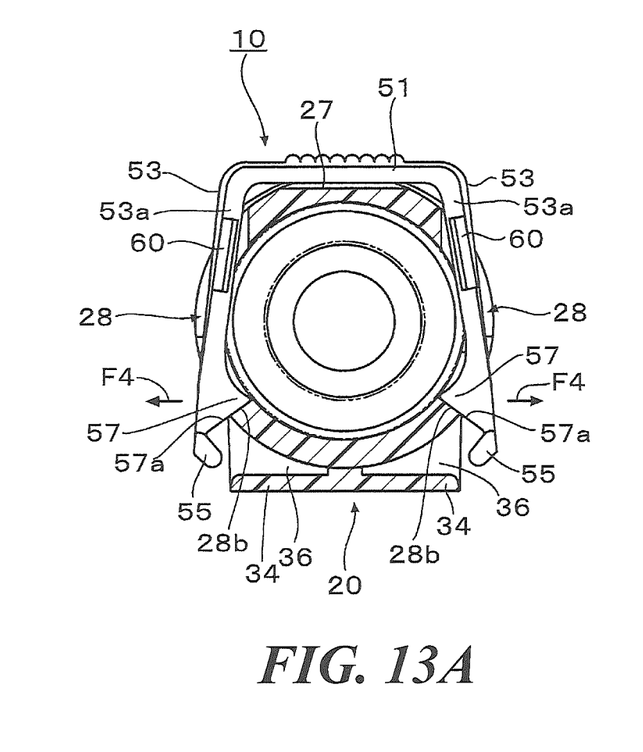
Figure 13B:
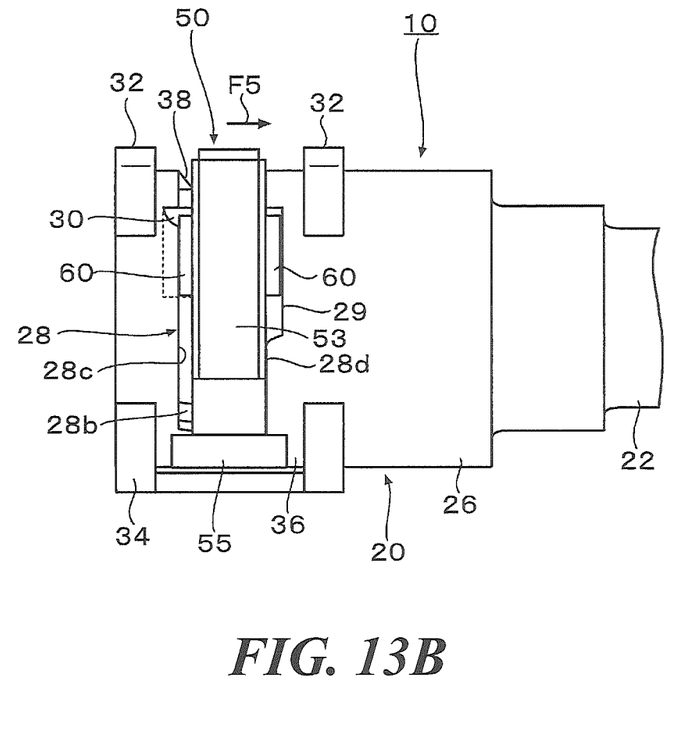

As shown in FIGS. 4, 11A and 11B, in a plan view, the grooves 30 are provided on the inner circumferential surfaces 28c of the slits 28 at positions closer to the inner circumferential surfaces 28a at the one end portions in the circumferential direction. The grooves 30 include engaging surfaces 30a that extend along the axial direction of the housing 20, and taper surfaces 30b that is inclined into a radial inward direction of the housing 20 so that the widths of the grooves 30 are gradually reduced toward the insertion portion 24. The grooves 30 are formed from an outer circumference of the peripheral wall 26 of the housing 20 to the inside of the insertion portion 24 as shown in FIGS. 5, 12A and 12B (see the portions indicated with the broken lines).

Figure 2:
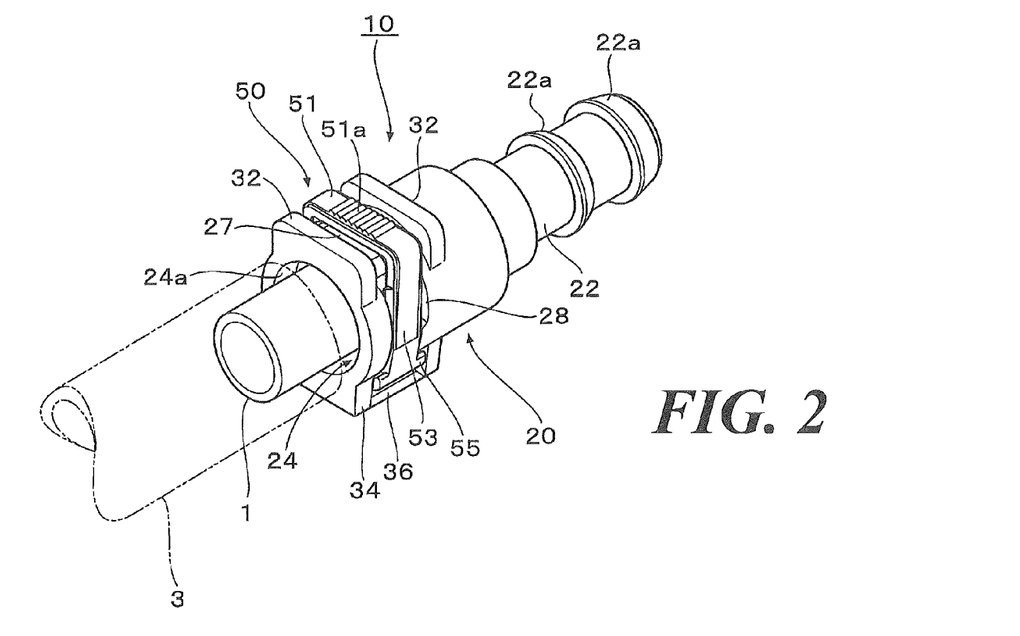
FIG. 2 is a perspective view of the connector.

A pair of vertical walls 32, 32 protrude from the peripheral wall 26 at both the sides of the flat surface 27 (see FIGS. 1 to 3). Also, frame-shaped walls 34, 34 protrude from the peripheral wall 26 so as to surround peripheral edge portions of the slits 28 at the sides of the inner circumferential surfaces 28b, 28b at the other end portions in the circumferential direction. Holding recesses 36, 36 are provided insides of the frame-shaped walls 34, 34, respectively (see FIGS. 2, 3 and 5).

As shown in FIGS. 4, 5, and 10, an inclined protrusion 38 is provided on a peripheral edge portion of the flat surface 27 at the side of the insertion portion 24. The inclined protrusion 38 gets lower gradually toward the side of the connecting portion 22 and has an approximate arc shape in a plan view. The inclined protrusion 38 causes the retainer 50 to move to the side of the connecting portion 22 of the housing 20 when the retainer 50 is pressed toward the housing 20 (see FIGS. 12A and 12B).

As shown in FIG. 10, the housing 20 has an internal shape of being reduced gradually in diameter from the side of the opening 24a of the insertion portion 24. Inside the housing 20, a ring receiving portion 40 is formed behind the insertion portion 24, and a pipe-member receiving portion 41 is formed further behind the ring receiving portion 40. The ring receiving portion 40 is smaller in diameter than the inner diameter of the insertion portion 24, and the seal ring 70 and the stopper ring 72 are to be placed thereto. The pipe-member receiving portion 41 is smaller in diameter than the inner diameter of the ring receiving portion 40, and a distal end portion of the first pipe member 1 is to be inserted thereto. A ring-shaped groove 40a with which a ring-shaped protrusion 72a of the stopper ring 72 is engaged is formed in the ring receiving portion 40 at a midpoint in an axial direction.

Figure 7:
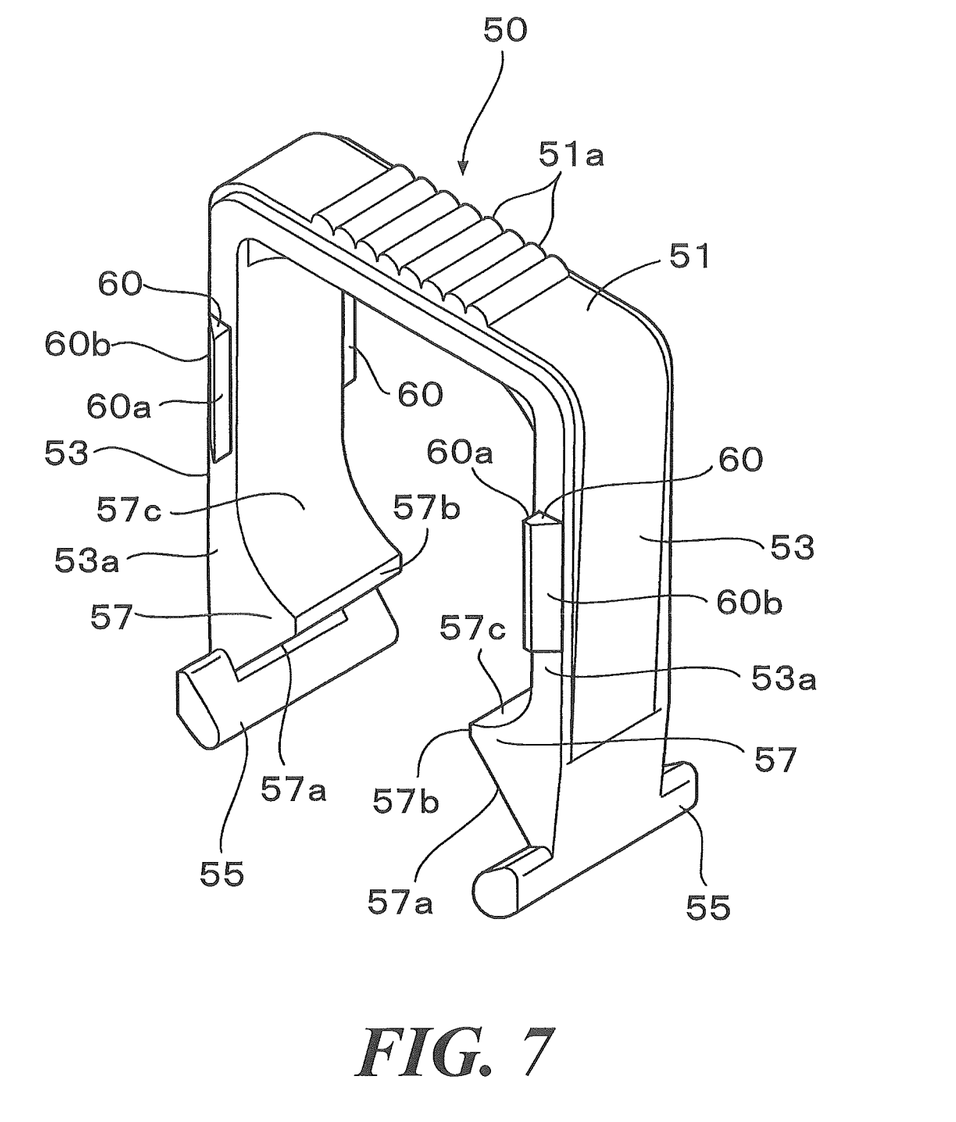
FIG. 7 is a perspective view of a retainer of the connector according to the present invention.
Figure 8:
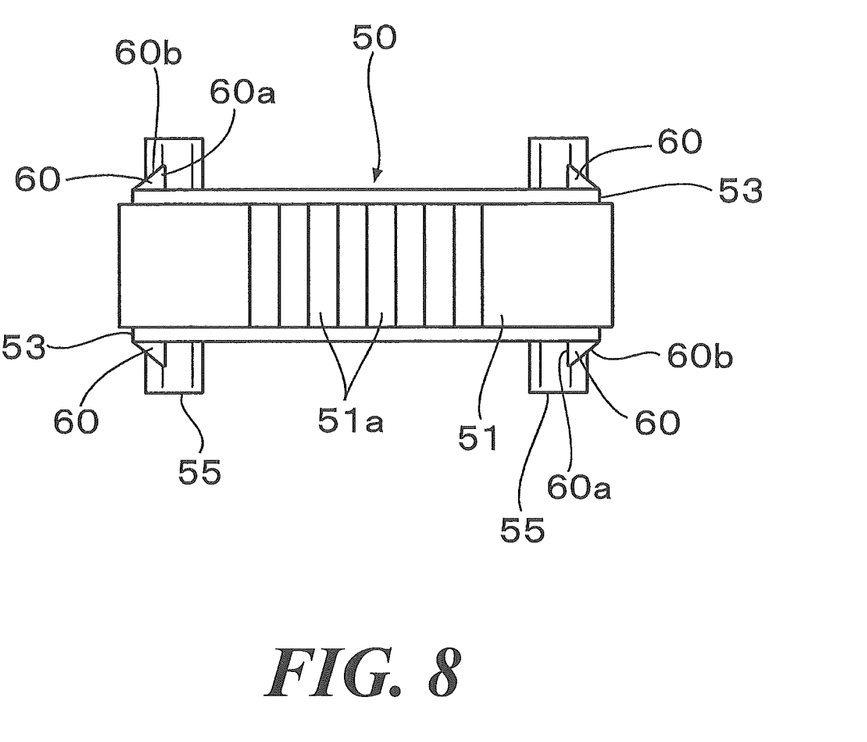
FIG. 8 is a plan view of the retainer.
Figure 9:
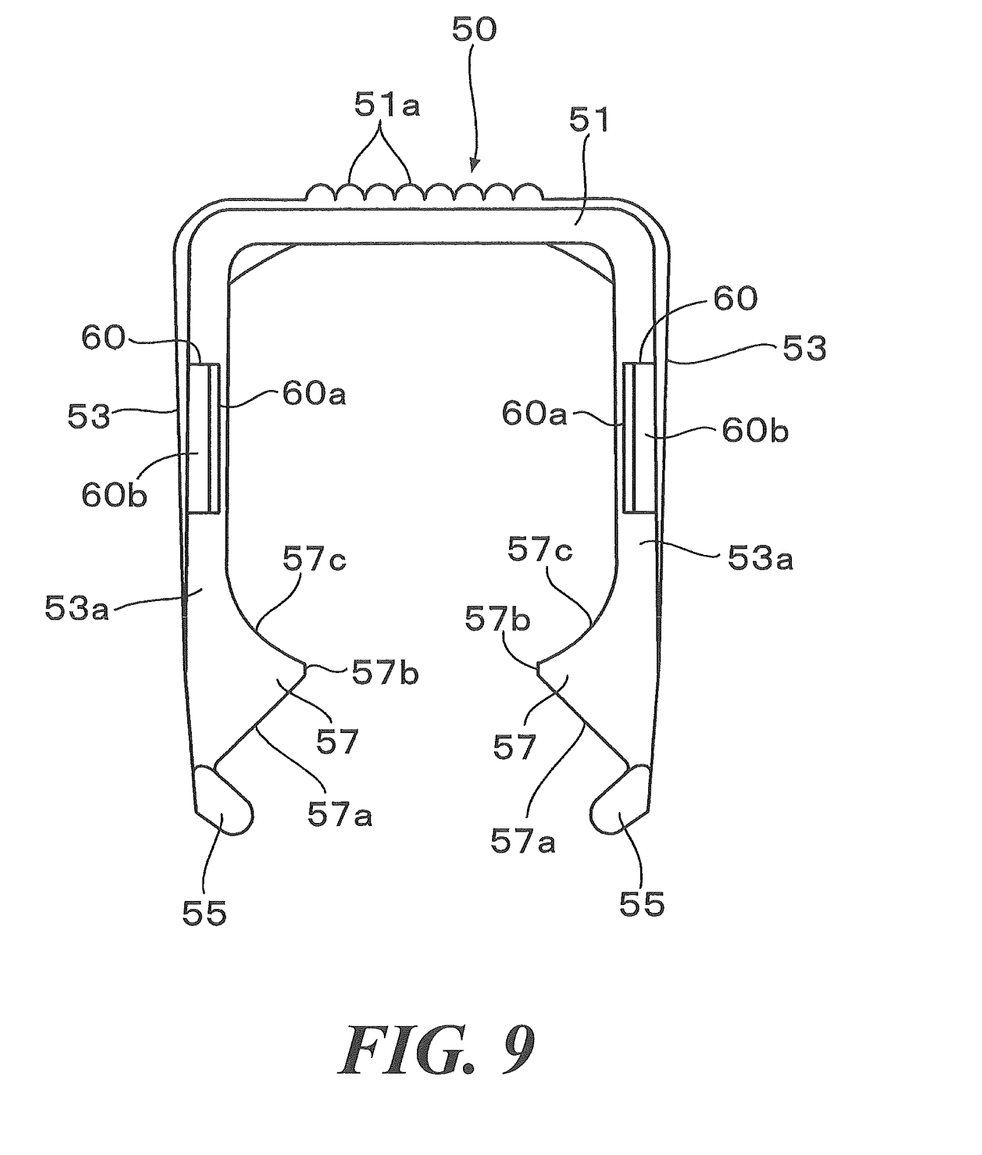
FIG. 9 is a front view of the retainer.

The retainer 50 is to be mounted on the above-described housing 20. The retainer 50 includes a base portion 51 and a pair of arms 53, 53. The base portion 51 has a long plate shape, and is provided with streaky antiskid protrusions 51a on an external surface thereof. The arms 53, 53 extend predetermined lengths vertically from both lengthwise ends of the base portion 51, and are made flexible. The retainer 50 has an arch shape as a whole as shown in FIGS. 7 to 9.

In the present invention, the arch shape is not limited to the above-described angular-U shape, and it may have the rounded-U shape, for example.

The pair of arms 53 are inserted into the pair of slits 28, 28 of the housing 20. The arms 53 have a width slightly smaller than the distance between the inner circumferential surfaces 28c and the inner circumferential surfaces 28d of the slits 28. Thus, when the arms 53 are inserted into the slits 28, the retainer 50 is allowed to slide toward the side of the connecting portion 22 or the side of the insertion portion 24 along the axial length of the housing 20 (see FIGS. 11A to 13B).

Protruding pieces 55 protrude from the arms 53 at end portions thereof. The protruding pieces 55 are wider than the width of the arms 53 and also wider than the distance between the inner circumferential surfaces 28c and the inner circumferential surfaces 28d of the slits 28, 28.

Also, engaging portions 57 inwardly protrude from the arms 53 at positions closer to the base end portions than the protruding pieces 55. The engaging portions are to be inserted into an inner circumference of the insertion portion 24 of the housing 20 through the slits 28, and are to be engaged with the flange portion 1a of the first pipe member 1, thereby retaining the first pipe member 1.

As shown in FIGS. 7 and 9, distal end surfaces 57a of the engaging portions 57 have an inclined shape of getting lower gradually from upper portions 57b that protrude the highest toward the distal ends of the arms. When the arms 53 are inserted into the slits 28 and the engaging portions 57 protrude to the inner circumference of the insertion portion 24, the distal end surfaces 57a of the engaging portions 57 face the inner circumferential surfaces 28b at the other end portions in the circumferential direction of the slits 28 (see FIG. 10). Further, when the retainer 50 is pressed toward the housing 20, the pair of arms 53, 53 are expanded as the distal end surfaces 57a of the engaging portions 57 are pressed by being brought into contact with the inner circumferential surfaces 28b of the slits 28 (see FIGS. 13A and 13B). On the other hand, base end surfaces 57c of the engaging portions 57 have an arc shape of inclining from the upper portions 57b toward the base ends of the arms, which corresponds to the circular cylindrical shape of the first pipe member 1 as shown in FIGS. 7 and 9.

As shown in FIGS. 7, 8, 11A and 11B, ribs 60, 60 having a taper shape protrude from outer surfaces 53a, 53a on the both sides in the widthwise directions at midpoints in the lengthwise directions of the arms 53. Thus, when the arms 53 are inserted into the slits 28, the ribs 60 on either one of the outer surfaces 53a, 53a, that is, the ribs 60 on the outer surfaces 53a at the side of the first pipe member pull-out direction F1 face the grooves 30 that are formed on the inner circumferential surfaces 28c of the slits 28 at the side of the first pipe member pull-out direction F1, and when a force to pull out the first pipe member 1 from the insertion portion 24 of the housing 20 is exerted in this state, the ribs 60 are inserted into the grooves 30 to urge the pair of arms 53 in directions of approaching each other (see FIGS. 11A and 11B).

In other words, in the present embodiment, the grooves 30 having a taper shape that are formed on the inner circumferential surfaces 28c of the slits 28 at the side of the first pipe member pull-out direction F1, and the ribs 60 having a taper shape that are formed on the outer surfaces 53a of the arms 53 at the side of the first pipe member pull-out direction F1 function as an "inclinatory contact portion" according to the present invention that urges the pair of arms 53, 53 in the directions of approaching each other when a pull-out force is exerted on the first pipe member 1.

The ribs 60 extend a predetermined length in the lengthwise directions of the arms 53, and include inner surfaces 60a that are formed on the inner side of the ribs 60 and taper surfaces 60b that are formed on the outer side of the ribs 60. The inner surfaces 60a extend perpendicularly to the outer surfaces 53a. The taper surfaces 60b are inclined so that heights of the ribs 60 gradually increase from the outer side to the inner side of the arms 53, 53.

Next, an exemplary method for using the above-described connector 10 will be described.

First, the seal ring 70 is inserted from the opening 24a of the insertion portion 24 of the housing 20 and disposed at the ring receiving portion 40, and then the stopper ring 72 is inserted from the opening 24a to engage the ring-shaped protrusion 72a of the stopper ring 72 with the ring-shaped groove 40a of the ring receiving portion 40, whereby the seal ring 70 is retained to be held (see FIG. 10). In addition, the second pipe member 2 is connected with the connecting portion 22 by mounting an end portion of the second pipe member 2 on the outer circumference of the connecting portion 22 of the housing 20 to make the ring-shaped protrusions 22a bites into the inner circumference of the second pipe member 2. The second pipe member 2 may be connected with the housing 20 after the first pipe member 1 is connected with the housing 20.

Then, as shown in FIG. 1, the retainer 50 is disposed on the outer circumference of the housing 20 such that the pair of arms 53, 53 of the retainer 50 are matched to the pair of slits 28, 28 of the housing 20. Then, the protruding pieces 55, 55 provided at the end portions of the arms 53 are disposed between the vertical walls 32, 32 of the housing 20, and the retainer 50 is pressed toward the housing 20. Thus, the protruding pieces 55 of the arms 53 are pressed along the outer circumference of the peripheral wall 26 of the housing 20, and the pair of arms 53, 53 are deformed in directions of expanding and separating from each other. When the protruding pieces 55 of the arms 53 enter into and are engaged with the holding recesses 36 of the housing 20, the pair of arms 53, 53 flexibly return to be inserted into the pair of slits 28, 28 while the engaging portions 57, 57 of the arms 53 protrude to the inner circumference of the insertion portion 24, whereby the retainer 50 is mounted on the housing 20 (see FIGS. 2, 10, 12A and 12B).

In this state, as shown in FIGS. 10 to 12B, the outer surfaces 53a of the arms 53 at the side of the first pipe member pull-out direction F1 are slightly separated from the inner circumferential surfaces 28c of the slits 28 at the side of the first pipe member pull-out direction F1. In addition, the ribs 60 having a taper shape that protrude from the outer surfaces 53a face the grooves 30 having a taper shape that are formed on the inner circumferential surfaces 28c while the ribs 60 protruding from the outer surfaces 53a of the arms 53 which are on the opposite side to the side of the first pipe member pull-out direction F1 are disposed at the rib-relief grooves 29 formed on the inner circumferential surfaces 28d of the slits 28. The base portion 51 of the retainer 50 is spaced from the flat surface 27 of the housing 20 by a predetermined height (see FIGS. 10, 12A and 12B).

In the present embodiment, because the housing 20 is provided with the pair of vertical walls 32, 32, the protruding pieces 55 can be held in the state of being positioned in the slits 28 when the retainer 50 is mounted on the housing 20. Thus, the retainer 50 can be easily pushed in toward the housing 20, and the pair of vertical walls 32, 32 can protect the base portion 51 of the retainer 50 after the retainer 50 is mounted (see FIG. 2).

Because the arms 53 are provided with the protruding pieces 55 that are wider than the distance between the inner circumferential surfaces 28c and the inner circumferential surfaces 28d of the slits 28, the distal ends of the arms 53 are prevented from being inserted into the slits 28 during the operation of pushing the retainer 50 into the housing 20, and the pair of arms 53, 53 can be reliably expanded, thereby improving the workability in mounting the retainer 50 on the housing 20.

After the retainer 50 is mounted, because the protruding pieces 55 that are wider than the slits 28 are engaged with the holding recesses 36 at the other end portions in the circumferential direction of the slits 28, the retainer 50 can be mounted on the housing 20 without rattle (see FIGS. 2, 12A and 12B).

Because the ribs 60, 60 protrude from the outer surfaces 53a, 53a on the both sides in the widthwise directions of the arms 53 of the retainer 50, the retainer 50 can be mounted in either direction regardless of which one the outer surfaces 53a of the aims 53 is aligned with the inner circumferential surfaces 28c of the slits 28 at the side of the first pipe member pull-out direction F1, thereby improving the mounting workability.

When the retainer 50 is mounted on the housing 20 and the engaging portions 57 of the arms 53 protrude into the inner circumference of the insertion portion 24 from the slits 28, the first pipe member 1 is inserted into the insertion portion 24 from the opening 24a of the insertion portion 24 of the housing 20. Thus, a taper surface of the flange portion 1a of the first pipe member 1 at the side of the insertion direction presses the side surfaces of the engaging portions 57 of the retainer 50 to cause the pair of the arms 53, 53 to be deformed in the direction separating from each other. Further, when the flange portion 1a of the first pipe member 1 climbs over the engaging portions 57 to reach the back side, the pair of arms 53, 53 flexibly return, and the engaging portions 57 engage the flange portion 1a of the first pipe member 1, whereby the first pipe member 1 is connected with the housing 20 while being retained (see FIGS. 2 and 10). At the same time, as shown in FIG. 10, the distal end portion of the first pipe member 1 is inserted into the inner circumference of the seal ring 70, and the outer circumference of the distal end portion of the first pipe member 1 and the inner circumference of the housing 20 are sealed with the seal ring 70. Thus, the second pipe member 2 can be connected to the first pipe member 1 and the third pipe member 3 connected therewith via the connector 10 a simple one-touch operation of only inserting the first pipe member 1 into the insertion portion 24 of the housing 20 after mounting the retainer 50 on the housing 20.

As a result, the first pipe member 1 is reliably prevented from being pulled out from the insertion portion 24 of the housing 20 even when a large pull-out force is exerted on the first pipe member 1. This configuration will be described with reference to FIGS. 11A and 11B.

In other words, when a pull-out force is exerted on the first pipe member 1 at the side of the first pipe member pull-out direction F1 as shown in FIG. 11A in a state where the first pipe member 1 is connected with the second pipe member 2 via the connector 10, the taper surfaces 60b of the ribs 60 protruding from the outer surfaces 53a of the arms 53 are brought into contact with the taper surfaces 30b of the grooves 30 formed on the inner circumferential surfaces 28c of the slits 28. Thus, the taper surfaces 60b of the ribs 60 are pressed against the taper surfaces 30b of the grooves 30, whereby the pair of arms 53, 53 are urged in the directions of approaching each other as indicated with the arrows F2 in FIG. 11B. As a result, the arms 53, 53 can be prevented from opening, and an engagement range between the flange portion 1a of the first pipe member 1 and the engaging portions 57 of the anus 53 can be increased, so that the first pipe member 1 can be reliably prevented from being pulled out from the insertion portion 24 of the housing 20, thereby increasing connection strength between the first pipe member 1 and the connector 10.

Especially in the present embodiment, because the inclinatory contact portion that includes the grooves 30 having a taper shape that are formed on the inner circumferential surfaces 28c of the slits 28 and the ribs 60 having a taper shape that protrude from the outer surfaces 53a of the arms 53 is adopted, large contact areas between the taper surfaces 60b of the ribs 60 and the taper surfaces 30b of the grooves 30 can be secured, so that the taper surfaces 60b of the ribs 60 are effectively pressed against the taper surfaces 30b of the grooves 30 when a pull-out force is exerted on the first pipe member 1 at the side of the first pipe member pull-out direction F1, thereby smoothly urging the pair of arms 53, 53 in the directions of approaching each other (see the arrows F2 in FIG. 11B). For example, even when a large impact force is exerted on an automobile because of an accident or the like, and a pull-out force is instantaneously exerted on the first pipe member 1, responsivity to the force is increased, thereby effectively preventing the first pipe member 1 from being pulled out from the insertion portion 24.

To detach the first pipe member 1 and the third pipe member 3 connected therewith from the connector 10 with which the second pipe member 2 is connected for maintenance etc., the base portion 51 of the retainer 50 is pressed toward the flat surface 27 of the housing 20 as shown in the arrow F3 in FIGS. 12A and 12B. Then, the distal end surfaces 57a of the engaging portions 57 of the arms 53 of the retainer 50 are strongly brought into contact with the inner circumferential surfaces 28b of the slits 28 (see FIGS. 5 and 12A to 13B), and the base portion 51 of the retainer 50 is brought into contact with the inclined protrusion 38 formed on the flat surface 27.

As a result, the distal end surfaces 57a of the engaging portions 57 are pressed by the inner circumferential surfaces 28b, and the base portion 51 is pressed by the inclined protrusion 38. Further, while the inclined protrusion 38 moves the retainer 50 to the side of the connecting portion 22 of the housing 20 as indicated with the arrow F5 in FIG. 13B, the pair of arms 53, 53 are pressed to be expanded as indicated with the arrows F4 in FIG. 13A, the engaging portions 57 of the arms 50 move outward from the inner circumference of the insertion portion 24, and the protruding pieces 55 of the arms 50 are pulled out from the holding recesses 36 to release the engagement of the flange portion 1a of the first pipe member 1 with the engaging portions 57 of the retainer 50.

In the present embodiment, only by pressing the retainer 50 toward the housing 20, the inclined distal end surfaces 57a of the engaging portions 57 of the arms 53 of the retainer 50 are brought into contact with the inner circumferential surfaces 28b at the end portions in the circumferential direction of the slits 28, and the pair of arms 53, 53 are expanded to release the engagement of the flange portion 1a of the first pipe member 1 with the engaging portions 57 of the retainer 50. Thus, the first pipe member 1 can be easily detached from the second pipe member 2.

In the present embodiment, the inner circumferential surfaces 28b at the other end portions in the circumferential direction of the slits 28 have the inclined shape of getting lower gradually from the side of the insertion portion 24 toward the side of the connecting portion 22 of the housing 20, and getting lower gradually from the radial inside to the radial outside of the insertion portion 24 (see FIGS. 5 and 6). Thus, when the retainer 50 is pressed toward the housing 20, and the engaging portions 57 of the retainer 50 are brought into contact with the inner circumferential surfaces 28b of the slits 28, the inclined shape of the inner circumferential surfaces 28b that are inclined from the side of the insertion portion 24 toward the side of the connecting portion 22 (see FIGS. 5 and 10) moves the retainer 50 to the side of the connecting portion 22 as described above to separate the inner circumferential surfaces 28c of the slits 28 at the side of the first pipe member pull-out direction F1 from the outer surfaces 53a of the arms 53 at the side of the first pipe member pull-out direction F1 to pull out the ribs 60 from the grooves 30, and the inclined shape of the inner circumferential surfaces 28c that are inclined from the radial inside to the radial outside of the insertion portion 24 presses to expand the pair of arms 53, 53 to release the engagement of the flange portion 1a of the first pipe member 1 with the engaging portions 57 of the retainer 50, whereby the first pipe member 1 can be more smoothly detached from the second pipe member 2.

In the present embodiment, because when the retainer 50 is pressed toward the housing 20, the base portion 51 of the retainer 50 is brought into contact with the inclined protrusion 38 provided on the housing 20, and the inclined protrusion 38 can move the retainer 50 to the side of the connecting portion 22 as described above, the inner circumferential surfaces 28c of the slits 28 at the side of the first pipe member pull-out direction F1 can be separated from the outer surfaces 53a of the arms 53 at the side of the first pipe member pull-out direction F1. Thus, the ribs 60 can be pulled out from the grooves 30, so that the pair of arms 53, 53 can be easily opened to smoothly release the engagement of the flange portion 1a of the first pipe member 1 with the engaging portions 57 of the retainer 50.

In the present embodiment, the inclinatory contact portion is configured by the grooves 30 having a taper shape that are formed on the inner circumferential surfaces 28 of the slits 28 at the side of the first pipe member pull-out direction F1 and the ribs 60 having a taper shape that protrude from the outer surfaces 53a at the side of the first pipe member pull-out direction F1. However, the present invention is not limited thereto. For example, either of the grooves 30 and the ribs 60 may have a taper shape. In addition, ribs may be provided on the slits 28, and grooves may be provided on the arms 53.

REFERENCE SIGNS LIST

1 First pipe member
1a Flange portion
2 Second pipe member
10 Connector
20 Housing
22 Connecting portion
24 Insertion portion
28 Slit
28a, 28b, 28c, 28d Inner circumferential surfaces
30 Groove
50 Retainer
53 Arm
53a Outer surface
57 Engaging portion
57a Distal end surface
60 Rib

The invention claimed is:

1. A connector for connecting a first pipe member having a flange portion around an outer circumference with a second pipe member, the connector comprising:
a tube shaped housing having
a connecting portion, at one end thereof, formed to be connected with the second pipe member,
an insertion portion, at the other end thereof, formed to be inserted with the first pipe member, and
a pair of slits formed on a peripheral wall at a side of the insertion portion; and a arch shaped retainer having
a pair of arms formed to be inserted into the slits, and
engaging portions inwardly protruding from the arms to enter into an inner circumference of the insertion portion of the housing and to be engaged with the flange portion of the first pipe member, thereby retaining the first pipe member,
wherein an inclinatory contact portion is provided between inner circumferential surfaces of the slits at a side of a first pipe member pull-out direction and outer surfaces of the arms at a side of the first pipe member pull-out direction, such that the pair of arms are urged in directions of approaching each other when a force to pull out the first pipe member from the insertion portion is exerted.

2. The connector of claim 1,
wherein the inclinatory contact portion has:
tapered grooves formed on the inner circumferential surfaces of the slits at the side of the first pipe member pull-out direction; and
tapered ribs formed on the outer surfaces of the arms at the side of the first pipe member pull-out direction.

3. The connector of claim 1
wherein distal end surfaces of the engaging portions of the retainer have inclined shapes of expanding the pair of arms to release engagement with the flange portion of the first pipe member when the retainer is pressed toward the housing to bring the engaging portions into contact with end portions in a circumferential direction of the slits.

4. The connector of claim 1,
wherein inner circumferential surfaces of end portions in a circumferential direction of the slits have inclined shapes of getting lower gradually from a side of the insertion portion of the housing toward a side of the connecting portion of the housing and of getting lower gradually from a radial inside to the radial outside of the insertion portion of the housing.

5. The connector of claim 1,
wherein the housing has an inclined protrusion on an outer circumference of a peripheral wall between the pair of slits formed to cause the retainer to move to the side of the connecting portion of the housing when the retainer is pressed toward the housing.

\* \* \* \* \*